United States Patent
Jhoney et al.

(10) Patent No.: US 9,917,758 B2
(45) Date of Patent: Mar. 13, 2018

(54) OPTIMIZING LOG ANALYSIS IN SAAS ENVIRONMENTS

(71) Applicant: International Business Machines Corporation, Armonk, NY (US)

(72) Inventors: Albee Jhoney, Bangalore (IN); Hariharan Krishna, Hyderabad (IN); Rohit Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 14/667,722

(22) Filed: Mar. 25, 2015

(65) Prior Publication Data
US 2016/0285728 A1    Sep. 29, 2016

(51) Int. Cl.
*H04L 12/26* (2006.01)
*H04L 12/24* (2006.01)

(52) U.S. Cl.
CPC ........ *H04L 43/0894* (2013.01); *H04L 41/069* (2013.01); *H04L 43/16* (2013.01)

(58) Field of Classification Search
CPC ........................... H04L 43/0894; H04L 43/16
See application file for complete search history.

(56) References Cited

U.S. PATENT DOCUMENTS

| | | | |
|---|---|---|---|
| 8,493,847 B1 * | 7/2013 | Kondapalli | H04L 47/10 370/229 |
| 8,671,097 B2 | 3/2014 | Wu et al. | |
| 9,442,940 B1 * | 9/2016 | Panchauli | G06F 17/30073 |
| 9,497,658 B2 * | 11/2016 | Lientz | H04L 41/0896 |
| 2010/0274871 A1 * | 10/2010 | Harrang | H04L 1/0002 709/217 |
| 2012/0089568 A1 | 4/2012 | Manley et al. | |
| 2016/0117196 A1 * | 4/2016 | Talwar | G06F 13/14 718/104 |

FOREIGN PATENT DOCUMENTS

| | | | | |
|---|---|---|---|---|
| CN | 103747048 A | | 4/2014 | |
| CN | 104391954 A | * | 3/2015 | ............. G06F 17/30 |

OTHER PUBLICATIONS

Dai, et al., "Data log processing method and device", Mar. 4, 2015, CN104391954A, Google English Translation, 22 pages.*

* cited by examiner

*Primary Examiner* — Brian J Gillis
*Assistant Examiner* — Amy Ling
(74) *Attorney, Agent, or Firm* — Brian M. Restauro

(57) ABSTRACT

Embodiments of the present invention provide methods, computer program products, and systems for optimizing log analysis, such as in SaaS environments. Embodiments of the present invention can be used to determine an optimal log analysis location and ensure that the log file is processed at the optimal location based, at least in part, on the log file size and available network bandwidth.

17 Claims, 4 Drawing Sheets

OPTIMIZING LOG ANALYSIS IN SAAS ENVIRONMENTS

BACKGROUND OF THE INVENTION

The present invention relates generally to the field of data analytics, and more particularly to data analytics in SaaS environments.

Log analytics refers to the science of interpreting computer generated records known as logs. Logs, in their broadest sense, are a written record of events that are encountered by one or more computing devices in the form of a stream of messages in time-sequence. Logs be used by computing devices for a wide variety of purposes. For example, logs may be used to record events encountered during an installation of software. Other times, logs can record errors in a particular application. System error logs store a record of all the error reports that are received from system components. The error log can then be used by system administrators or maintenance engineers to trace and understand the cause of the error.

Data found on these logs can range from a few hundred megabytes to a few terabytes. Logs can be transmitted by network devices, operating systems, applications, and programmable devices to servers dedicated to analyzing data found in logs. Other times, logs can be written, stored, and analyzed locally on the user's computer after log analysis software has been "pushed" to the user's computer from the server.

SUMMARY

Embodiments of the present invention provide methods, program products, and systems for optimizing log analysis. In one embodiment of the present invention, a method is provided comprising: identifying, by one or more computer processors, a log file to be processed; identifying, by one or more computer processors, a file size of the log file and network bandwidth available to transmit log file data from a first computer system to a second computer system; determining, by one or more computer processors, an optimal log analysis location based, at least in part, on the identified file size and the identified network bandwidth; and processing, by one or more computer processors, the identified log file based, at least in part, on the identified optimal log analysis location.

DETAILED DESCRIPTION

Embodiments of the present invention recognize the need to provide more efficient allocation of resources for processing logs. Sometimes, log file sizes can be massive (e.g., a few gigabytes to a few terabytes). Transmitting these logs over a slow network connection to a server dedicated to processing logs can be time consuming and inefficient. Conversely, pushing log analysis software to a local computer to process the log may be an equally inefficient use of resources to analyze a log that is small in size. Embodiments of the present invention provide solutions for determining a log analysis location and ensuring that the log file is processed at the optimal location, based, at least in part, on log file size and network bandwidth. In this manner, as discussed in greater detail later in this specification, embodiments of the present invention can be used to optimize processing of logs.

Figure 1:
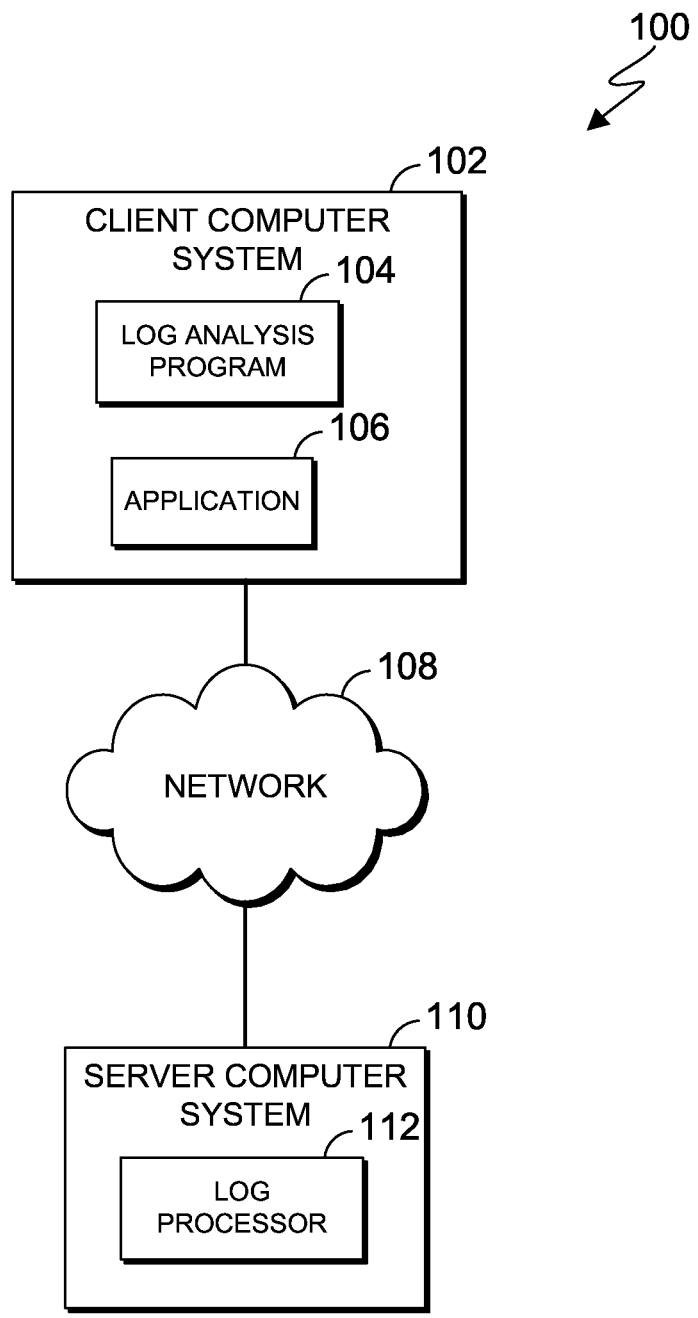
FIG. 1 is a functional block diagram illustrating a computing environment, in accordance with an embodiment of the present invention.

FIG. 1 is a functional block diagram of a computing environment 100, in accordance with an embodiment of the present invention. Computing environment 100 includes client computer system 102 and server computer system 110, interconnected via network 108. Client computer system 102 and server computer system 110 can be desktop computers, laptop computers, specialized computer servers, or any other computer systems known in the art. In certain embodiments, client computer system 102 and server computer system 110 represent computer systems utilizing clustered computers and components to act as a single pool of seamless resources when accessed through network 108. In certain embodiments, client computer system 102 and server computer system 110 represent virtual machines. In general, client computer system 102 and server computer system 110 are representative of any electronic devices, or combination of electronic devices, capable of executing machine-readable program instructions, as described in greater detail with regard to FIG. 4.

Client computer system 102 includes log analysis program 104 and application 106. Log analysis program 104 receives logs from application 106, and determines the optimal analysis location to process logs based, at least in part, on log file size and network bandwidth. The term "optimal analysis location", as used herein, refers to a location at which to analyze a log that is determined based on file size of the log and available bandwidth. The optimal analysis location may be an endpoint location where the log was generated, a dedicated log analysis server, or a combination of the endpoint location and dedicated log analysis server. For illustrative purposes, this embodiment may be discussed with respect to client computer system 102 serving as the endpoint location and server computer system 110 serving as the dedicated log analysis server. Responsive to determining that the optimal location to process a log is on client computer system 102, log analysis program 104 can instruct log processor 112 to push log analysis software to client computer system 102 and processes the log accordingly. If log analysis program 104 determines that the optimal location to process a log is on server computer system 110, log analysis program 104 can then transmit the log over network 108 to log processor 112 for processing.

Application 106 monitors one or more components of client computer system 102, generates logs for client computer system 102, and sends the generated logs to log analysis program 104. Application 106 can generate logs responsive to detecting errors in client computer system 102. The term, "logs", as used herein, refer to generated files that record events that occur in a computer system. For example, an error log is a file containing information for errors that have occurred on one or more computer systems (e.g., error identifiers, timestamps, causes, etc.). A transaction log is a file that contains information for database transactions, such as reads, writes, and deletes, which can allow a database to be recovered after system failure. Application 106 can also receive logs from one or more components of client computer system 102.

Server computer system 110 includes log processor 112. Log processor 112 is an application or service that can read and parse log files to generate readable data. Log processor 112 receives log files from log analysis program 104, analyzes the received log files, and sends the analyzed log files to log analysis program 104. For example, where the received log file is an error log, log processor 112 can parse the log file and, based on values contained in the log file, parses out indicators pertaining to what caused an application to fail. Log processor 112 can also push log analysis software to client computer system 102 responsive to receiving instructions from log analysis program 104.

Network 108 can be, for example, a local area network (LAN), a wide area network (WAN) such as the Internet, or a combination of the two, and include wired, wireless, or fiber optic connections. In general, network 108 can be any combination of connections and protocols that will support communications between client computer system 102, log analysis program 104, application 106, server computer system 110 and log processor 112, in accordance with a desired embodiment of the invention.

Figure 2:
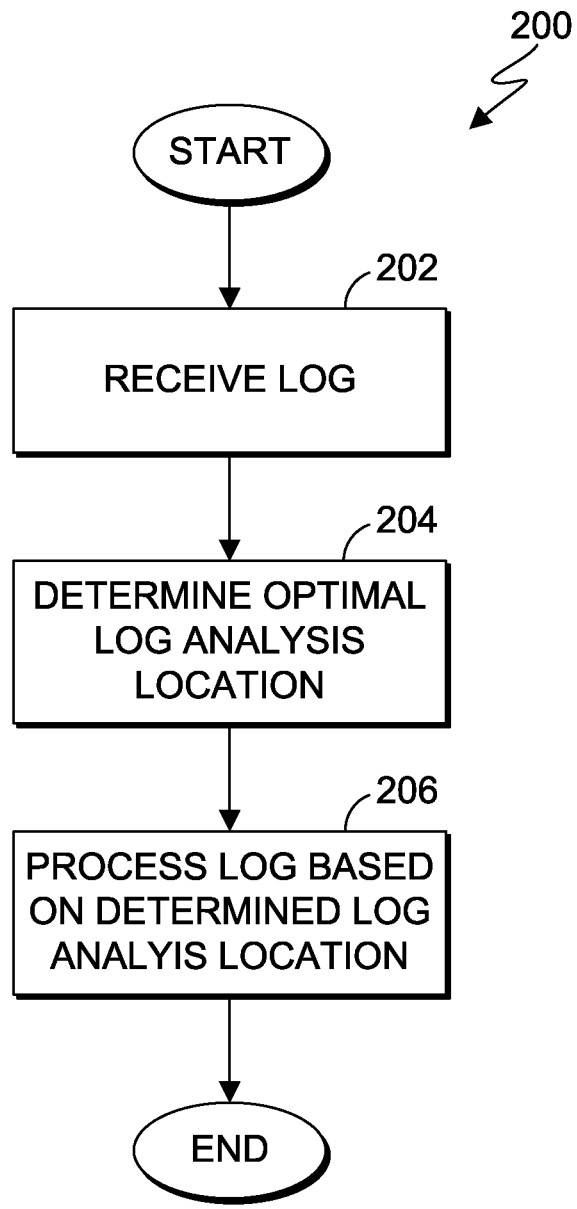
FIG. 2 is a flowchart illustrating operational steps for processing a log, in accordance with an embodiment of the present invention.

FIG. 2 is a flowchart 200 illustrating operational steps for processing a log, in accordance with an embodiment of the present invention.

In step 202, log analysis program 104 receives a log from client computer system 102 generated by application 106. In this embodiment, log analysis program 104 receives a log in the event of a failure of one or more components of client computer system 102. The term, "failure", as used herein, refers generally to any abnormal termination, interruption, or error in software and/or hardware in the client computer system or another component of the computing environment that affects client computer system 102.

In step 204, log analysis program 104 determines an optimal log analysis location for the received log. In this embodiment, log analysis program 104 determines the optimal log analysis location based, at least in part, on file size of the received log and available network bandwidth to transmit the log file to a server computer system 110 via network 108, as discussed in greater detailed with regard to FIG. 3.

In step 206, log analysis program 104 processes the log, based on the determined optimal log location. For example, if log analysis program 104 determined the optimal log analysis location to be server computer system 110, log analysis program 104 transmits the log to server computer system 110 for processing. If log analysis program 104 determined the optimal log analysis location to be client computer system 102, log analysis program 104 calls log processor 112 to send software to client computer system 102 to enable log analysis program 104 to process the log. If, for example, log analysis program 104 determined the optimal log analysis location to be a combination of client computer system 102 and server computer system 110, log analysis program can divide the log file into two portions (e.g., A and B) for processing. For example, log analysis program 104 can send portion A of the log file to log processer 112 for processing. Log analysis program 104 can further transmit a command to log processor 112 instructing log processor 112 to push log analysis software to client computer system 102. Responsive to receiving log analysis software, log analysis program 104 can then process portion B of the log file locally.

Figure 3:
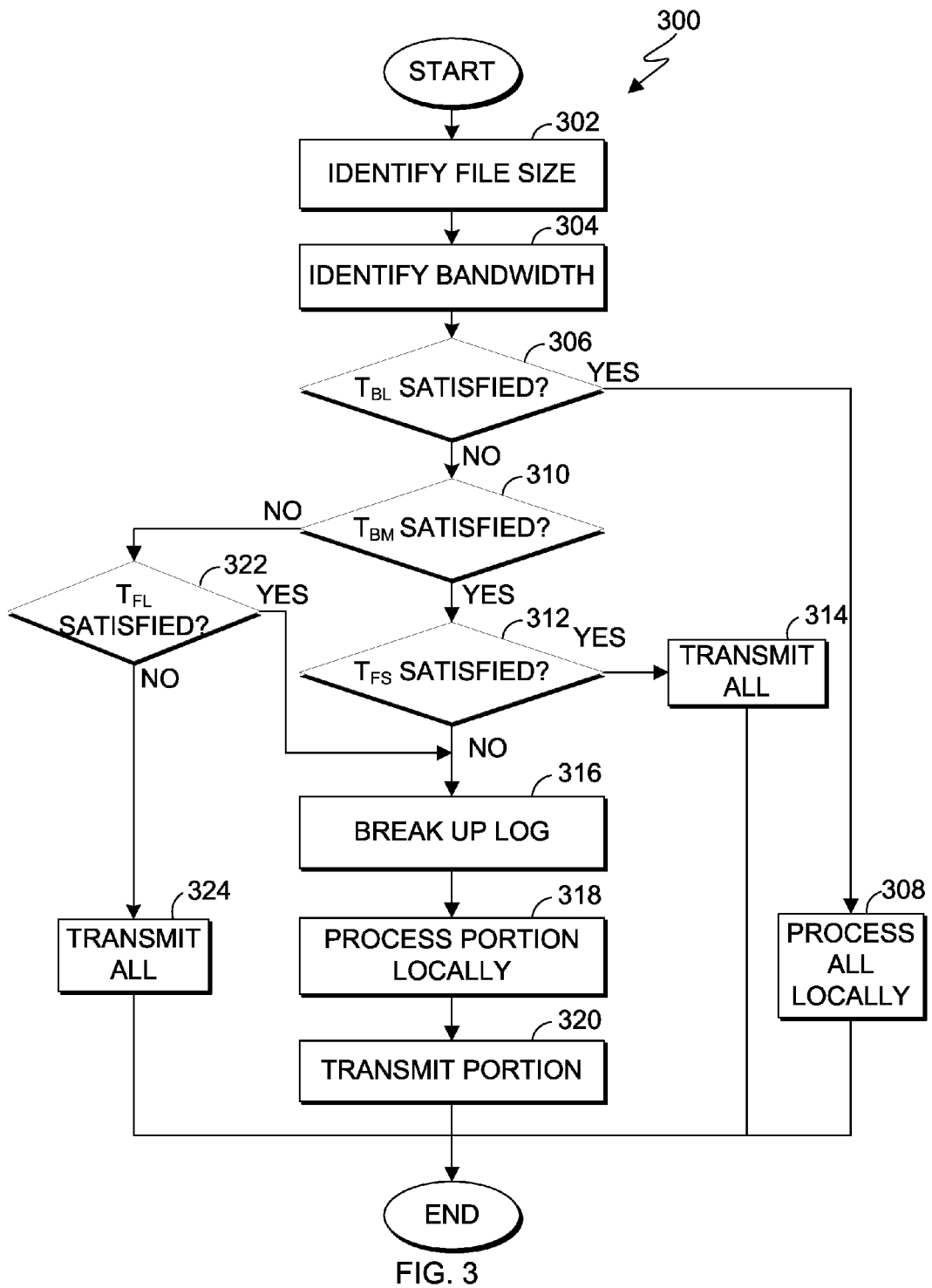
FIG. 3 is a flowchart illustrating operational steps for selecting a log analysis location, in accordance with an embodiment of the present invention.

FIG. 3 is a flowchart 300 illustrating operational steps for selecting a log analysis location, in accordance with an embodiment of the present invention. For example, the operational steps of flowchart 300 can be performed at step 204 of flowchart 200.

In step 302, log analysis program 104 identifies the log file size of a received log. For example, the log file size can range from a kilobyte to greater than a gigabyte.

In step 304, log analysis program 104 identifies the current bandwidth (e.g., the amount of data that can be transferred during a second, expressed as bits per second) of one or more connections of network 108 that can be used to transmit log data from client computer system 102 to server computer system 110.

In step 306, log analysis program 104 determines whether the identified bandwidth satisfies a first threshold bandwidth (TBL). In this embodiment, bandwidth less than or equal to 100 kilobytes per second satisfies TBL. In other embodiments, TBL can be configured with any desired bandwidth value that represents a slow transmission speed.

If, in step 306, log analysis program 104 determines that TBL is satisfied, then, in step 308, log analysis program 104 processes the log locally on client computer system 102. In this embodiment, log analysis program 104 processes the log locally by transmitting a command to log processor 112 to push log analysis software to client computer system 102. Responsive to receiving log analysis software, log analysis program 104 executes the software to process the log.

If, in step 306, log analysis program 104 determines that $T_{BL}$ is not satisfied, then, in step 310, log analysis program 104 determines whether the identified bandwidth satisfies a second threshold bandwidth ($T_{BM}$). In this embodiment, bandwidth greater than $T_{BL}$ but less than 30 megabytes per second satisfies $T_{BM}$. In other embodiments, $T_{BM}$ can be configured with any desired bandwidth value that represents a medium transmission speed.

If, in step 310, log analysis program 104 determines that $T_{BM}$ is satisfied, then, in step 312, log analysis program 104 determines whether the identified size satisfies a first threshold size ($T_{FS}$). In this embodiment, log file sizes less than or equal to 100 megabytes satisfies $T_{FS}$. In other embodiments, $T_{FS}$ can be configured with any desired file size that represents a small file size.

If, in step 312, log analysis program 104 determines if $T_{FS}$ is satisfied, then, in step 314, log analysis program 104 transmits all logs to log processor 112 via network 108 for processing.

If, in step 312, log analysis program 104 determines that $T_{FS}$ is not satisfied, then in step 316, log analysis program 104 breaks up the log. In this embodiment, log analysis program 104 breaks up the log file by splitting the log file into a first and second portion. For example, log analysis program 104 can split the log file into two equally sized portions. In other embodiments, log analysis program 104 can split the log file into three or more portions of various file sizes.

In step 318, log analysis program 104 processes a portion of the log locally on client computer system 102. In this embodiment, log analysis program 104 processes the first portion of the log locally by transmitting a command to log processor 112 to push log analysis software to client computer system 102. Responsive to receiving log analysis software, log analysis program 104 can execute the software to process the log.

In step 320, log analysis program 104 transmits the remaining portion of the log to log processor 112 on server computer system 110 via network 108 to process the remaining portion of the log. In this embodiment, log analysis program 104 transmits the remaining second portion of the log.

If, in step 310, log analysis program 104 determines that $T_{BM}$ is not satisfied, then, in step 322, log analysis program 104 determines whether the identified size satisfies a second threshold size ($T_{FL}$). In this embodiment, a log file greater than or equal to one gigabyte satisfies $T_{FL}$. In other embodiments, $T_{FL}$ can be configured with any desired file size that represents a large file size.

If, in step 322, log analysis program 104 determines that $T_{FL}$ is not satisfied, then, in step 324, log analysis program 104 transmits all logs to log processor 112 for processing.

If, in step 322, log analysis program 104 determines that $T_{FL}$ is satisfied, then processing continues at step 316 until completion, as previously discussed.

Figure 4:
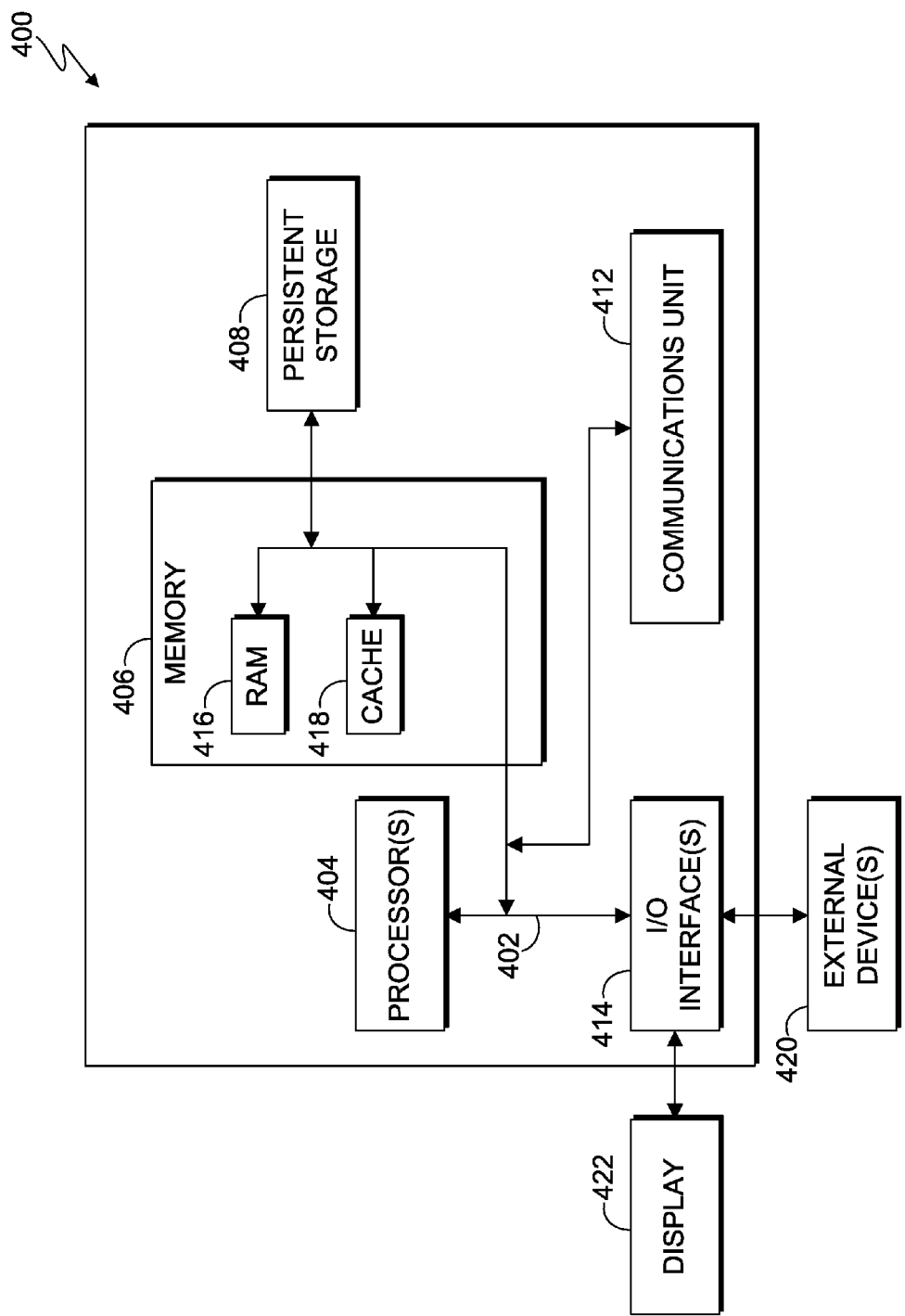
FIG. 4 is a block diagram of internal and external components of the computer systems of FIG. 1, in accordance with an embodiment of the present invention.

FIG. 4 is a block diagram of internal and external components of a computer system 400, which is representative the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 108). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to client computer system 102 through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420 such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for optimizing log analysis, comprising:

identifying, by one or more computer processors, a log file to be processed;

identifying, by one or more computer processors, a file size of the log, file and network bandwidth available to transmit log file data from a first computer system to a second computer system;

determining, by one or more computer processors, an optimal log analysis location based, at least in part, on the identified file size, the identified network bandwidth, current processing conditions, and a hierarchy of bandwidth thresholds and log file size thresholds, wherein determining an optimal log analysis location comprises:

determining, by one or more computer processors, whether the identified bandwidth satisfies a first threshold bandwidth:

responsive to determining that the identified bandwidth does not satisfy the first threshold bandwidth, determining, by one or more computer processors, whether the identified bandwidth satisfies a second threshold bandwidth;

responsive to determining that the identified bandwidth satisfies the second threshold bandwidth, determining by one or more computer processors, whether the identified log file size satisfies a first threshold file size; and responsive to determining that the identified log file size satisfies the first threshold file size, identifying, by one or more computer processors, the optimal log analysis location as being the second computer system; and processing, by one or more computer processors, the identified log file based, at least in part, on the identified optimal log analysis location, wherein processing the identified log file includes splitting portions of the identified log file, pushing log analysis software to the first computer system, transmitting at least a first portion of the identified log file to the first computer system for processing, and transmitting at least a second portion of the identified log file to the second computer system for processing.

2. The method of claim 1, wherein determining an optimal log analysis location comprises:

determining, by one or more computer processors, whether the identified bandwidth satisfies a first threshold bandwidth; and responsive to determining that the identified bandwidth satisfies the first threshold bandwidth, identifying, by one or more computer processors, the optimal log analysis location as being the first computer system, wherein the first computer system generated the identified log file.

3. The method of claim 1, wherein determining an optimal log analysis location comprises:

determining, by one or more computer processors, whether the identified bandwidth satisfies a first threshold bandwidth;

responsive to determining that the identified bandwidth does not satisfy the first threshold bandwidth, determining, by one or more computer processors, whether the identified bandwidth satisfies a second threshold bandwidth;

responsive to determining that the identified bandwidth satisfies the second threshold bandwidth, determining, by one or more computer processors, whether the identified log file size satisfies a first threshold file size; and responsive to determine that the identified file size does not satisfy the first threshold file size, identifying, by one or more computer processors, the optimal log analysis location as being a combination of the first computer system and the second computer system.

4. The method of claim 3, further comprising:

splitting, by one or more computer processors, the identified log file into multiple portions;

processing, by one or more computer processors, at least one portion of the identified log file on the first computer system; and transmitting, by one or more computer processors, at least one portion of the identified log file to the second computer system for processing on the second computer system.

5. The method of claim 1, wherein determining an optimal log analysis location comprises:

determining, by one or more computer processors, whether the identified bandwidth satisfies a first threshold bandwidth;

responsive to determining that the identified bandwidth does not satisfy the first threshold bandwidth, determining, by one or more computer processors, whether the identified bandwidth satisfies a second threshold bandwidth;

responsive to determining that the identified bandwidth does not satisfy the second threshold bandwidth, determining, by one or more computer processors, whether the identified log file size satisfies a second threshold file size; and responsive to determining that the identified log file size does not satisfy the second threshold file size, identifying, by one or more computer processors, the optimal log analysis location as being the second computer system.

6. The method of claim 1, wherein determining an optimal log analysis location comprises:

determining, by one or more computer processors, whether the identified bandwidth satisfies a first threshold bandwidth;

responsive to determining that the identified bandwidth does not satisfy the first threshold bandwidth, determining, by one or more computer processors, whether the identified bandwidth satisfies a second threshold bandwidth;

responsive to determining that the identified bandwidth does not satisfy the second threshold bandwidth, determining, by one or more computer processors, whether the identified log file size satisfies a second threshold file size; and responsive to determining that the log file size satisfies the second threshold file size, identifying, by one or more computer processors, the optimal log analysis location as being a combination of the first computer system and the second computer system.

7. The method of claim 6, further comprising:

splitting, by one or more computer processors, the identified log file into multiple portions;

processing, by one or more computer processors, at least one portion of the identified log file on the first computer system; and transmitting, by one or more computer processors, at least one portion of the identified log file to the second computer system for processing on the second computer system.

8. A computer program product for optimizing log analysis comprising:

one or more computer readable storage media and program instructions stored on the one or more computer readable storage media, the program instructions comprising:

program instructions to identify a log file to be processed;

program instructions to identify a file size of the log file and network bandwidth available to transmit log file data from a first computer system to a second computer system;

program instructions to determine an optimal log analysis location based, at least in part, on the identified file size, the identified network bandwidth, current processing conditions, and a hierarchy of bandwidth thresholds and log file size thresholds, wherein the program instructions to determine an optimal log analysis location comprise:

program instructions to determine whether the identified bandwidth satisfies a first threshold bandwidth; program instructions to, responsive to determining that the identified bandwidth does not satisfy the first threshold bandwidth, determine whether the identified bandwidth satisfies a second threshold bandwidth;
program instructions to, responsive to determining that the identified bandwidth satisfies the second threshold bandwidth, determine whether the identified log file size satisfies a first threshold file size; and
program instructions to, responsive to determining that the identified log file size satisfies the first threshold file size, identify the optimal log analysis location as being the second computer system; and
program instructions to process the identified log file based, at least in part, on the identified optimal log analysis location, wherein the program instructions to process the identified log file includes program instructions to:
splitting portions of the identified log file, pushing log analysis software to the first computer system, transmit at least a first portion of the identified log file to the first computer system for processing, and transmit at least a second portion of the identified log file to the second computer system for processing.

9. The computer program product of claim 8, wherein the program instructions to determine an optimal log analysis location comprise:
program instructions to determine whether the identified bandwidth satisfies a first threshold bandwidth; and
program instructions to, responsive to determining that the identified bandwidth satisfies the first threshold bandwidth, identify the optimal log analysis location as being the first computer system, wherein the first computer system generated the identified log file.

10. The computer program product of claim 8, wherein the program instructions to determine an optimal log analysis location comprise:
program instructions to determine whether the identified bandwidth satisfies a first threshold bandwidth;
program instructions to, responsive to determining that the identified bandwidth does not satisfy the first threshold bandwidth, determine whether the identified bandwidth satisfies a second threshold bandwidth;
program instructions to, responsive to determining that the identified bandwidth satisfies the second threshold bandwidth, determine whether the identified log file size satisfies a first threshold file size; and
program instructions to, responsive to determine that the identified file size does not satisfy the first threshold file size:
identify the optimal log analysis location as being a combination of the first computer system and the second computer system;
split the identified log file into multiple portions;
process at least one portion of the identified log file on the first computer system; and
transmit at least one portion of the identified log file to the second computer system for processing on the second computer system.

11. The computer program product of claim 8, wherein the program instructions to determine an optimal log analysis location comprise:
program instructions to determine whether the identified bandwidth satisfies a first threshold bandwidth;
program instructions to, responsive to determining that the identified bandwidth does not satisfy the first threshold bandwidth, determine whether the identified bandwidth satisfies a second threshold bandwidth;
program instructions to, responsive to determining that the identified bandwidth does not satisfy the second threshold bandwidth, determine whether the identified log file size satisfies a second threshold file size; and
program instructions to, responsive to determining that the identified log file size does not satisfy the second threshold file size, identify the optimal log analysis location as being the second computer system.

12. The computer program product of claim 8, wherein the program instructions to determine an optimal log analysis location comprise:
program instructions to determine whether the identified bandwidth satisfies a first threshold bandwidth;
program instructions to, responsive to determining that the identified bandwidth does not satisfy the first threshold bandwidth, determine whether the identified bandwidth satisfies a second threshold bandwidth;
program instructions to, responsive to determining that the identified bandwidth does not satisfy the second threshold bandwidth, determine whether the identified log file size satisfies a second threshold file size; and
program instructions to, responsive to determining that the log file size satisfies the second threshold file size, identify the optimal log analysis location as being a combination of the first computer system and the second computer system.

13. The computer program product of claim 12, further comprising:
program instructions to split the identified log file into multiple portions;
program instructions to process at least one portion of the identified log file on the first computer system; and
program instructions to transmit at least one portion of the identified log file to the second computer system for processing on the second computer system.

14. A computer system for optimizing log analysis comprising:
one or more computer processors;
one or more computer readable storage media; and
program instructions stored on the one or more computer readable storage media for execution by at least one of the one or more processors, the program instructions comprising:
program instructions to identify a log file to be processed;
program instructions to identify a file size of the log file and network bandwidth available to transmit log file data from a first computer system to a second computer system;
program instructions to determine an optimal log analysis location based, at least in part, on the identified file size, the identified network bandwidth, current processing conditions, and a hierarchy of bandwidth thresholds and log file size thresholds,
wherein the program instructions to determine an optimal log analysis location comprise:
program instructions to determine whether the identified bandwidth satisfies a first threshold bandwidth;
program instructions to, responsive to determining that the identified bandwidth does not satisfy the first threshold bandwidth determine whether the identified bandwidth satisfies a second threshold bandwidth;

program instructions to, responsive to determining that the identified bandwidth satisfies the second threshold bandwidth, determine whether the identified log file size satisfies a first threshold file size; and program instructions to, responsive to determining that the identified log file size satisfies the first threshold file size identify the optimal log analysis location as being the second computer system; and program instructions to process the identified log file based, at least in part, on the identified optimal log analysis location, wherein the program instructions to process the identified log file includes program instructions to: splitting portions of the identified log file, pushing log analysis software to the first computer system, transmit at least a first portion of the identified log file to the first computer system for processing, and transmit at least a second portion of the identified log file, to the second computer system for processing.

15. The computer system of claim 14, wherein the program instructions to determine an optimal log analysis location comprise:
  program instructions to determine whether the identified bandwidth satisfies a first threshold bandwidth; and
  program instructions to, responsive to determining that the identified bandwidth satisfies the first threshold bandwidth, identify the optimal log analysis location as being the first computer system, wherein the first computer system generated the identified log file.

16. The computer system of claim 14, wherein the program instructions to determine an optimal log analysis location comprise:
  program instructions to determine whether the identified bandwidth satisfies a first threshold bandwidth;
  program instructions to, responsive to determining that the identified bandwidth does not satisfy the first threshold bandwidth, determine whether the identified bandwidth satisfies a second threshold bandwidth;
  program instructions to, responsive to determining that the identified bandwidth satisfies the second threshold bandwidth, determine whether the identified log file size satisfies a first threshold file size; and
  program instructions to, responsive to determine that the identified file size does not satisfy the first threshold file size:
    identify the optimal log analysis location as being a combination of the first computer system and the second computer system;
    split the identified log file into multiple portions;
    process at least one portion of the identified log file on the first computer system; and
    transmit at least one portion of the identified log file to the second computer system for processing on the second computer system.

17. The computer system of claim 14, wherein the program instructions to determine an optimal log analysis location comprise:
  program instructions to determine whether the identified bandwidth satisfies a first threshold bandwidth;
  program instructions to, responsive to determining that the identified bandwidth does not satisfy the first threshold bandwidth, determine whether the identified bandwidth satisfies a second threshold bandwidth;
  program instructions to, responsive to determining that the identified bandwidth does not satisfy the second threshold bandwidth, determine whether the identified log file size satisfies a second threshold file size; and
  program instructions to, responsive to determining that the log file size satisfies the second threshold file size:
    identify the optimal log analysis location as being a combination of the first computer system and the second computer system;
    split the identified log file into multiple portions;
    process at least one portion of the identified log file on the first computer system; and
    transmit at least one portion of the identified log file to the second computer system for processing on the second computer system.

* * * * *